Patented Mar. 10, 1942

2,275,991

UNITED STATES PATENT OFFICE 2,275,991

TEXTILE PRINTING PASTE

Donald H. Powers, Moorestown, N. J., and Sivert N. Glarum, Ardmore, Pa., assignors to Röhm & Haas Company, Philadelphia, Pa.

No Drawing. Application May 28, 1938, Serial No. 210,794

8 Claims. (Cl. 260—32)

This invention relates to compositions used for printing textile fabrics and particularly to printing compositions containing aqueous emulsions of resinous materials.

Fabrics today are printed according to two general processes. The one which is more important consists in printing fabrics with dispersed dyestuffs which are substantive to the fiber. These dispersed colors are carried on the print rollers with a water-soluble thickener which is removed after the printing process is complete. In this process it is necessary to print, dry and steam for 5 to 10 minutes at 220–230° F., oxidize, soap, rinse, and dry. Only colors which have an affinity for the fiber can be used as non-substantive colors merely rest on the surface of the fiber and are washed off the fiber when the thickener is removed.

The second process for printing fabrics consists of lacquer printing where a paint or varnish dissolved in organic solvent containing a pigment or coloring matter is printed on the cloth. The lacquer dries on the surface of the fiber leaving a colored film which gives the effect of a printed fabric. This process has the disadvantage that it necessitates the use of highly inflammable organic solvents.

It is the object of our invention to produce printing compositions in which a large variety of coloring materials may be used but which do not require the use of organic solvents. A further object is to produce a printing composition that can be applied to the fabric by a simplified procedure.

Such printing compositions are prepared in accordance with the present invention by dissolving or dispersing in water a pale resinous material capable of binding a pigment to a textile, a finely divided pigment, and a thickening agent that in relatively low concentration is able to impart to the paste the thickness and low internal cohesion that is necessary for satisfactory printing. In addition, it is generally advisable, but not necessary, to add a wetting agent.

The resinous materials that are capable of binding the pigment to the textile are in general those that form a continuous film when deposited from an aqueous solution or suspension. They may be divided into three main classes; (1) water soluble resins which by subsequent treatment may be rendered water insoluble, (2) resins and resinous materials that are soluble in organic solvents and may in solution be emulsified in water, and (3) resins that are dispersable in water and which coalesce when deposited from an aqueous dispersion. Representative of the first class are water soluble urea-formaldehyde reaction products. These resins have been used with very satisfactory results but they have the disadvantage of requiring a subsequent heating step to convert the resin to a water insoluble condition. Representative of the second class are cellulose esters and ethers that are soluble in organic solvents, urea-formaldehyde-monohydric alcohol reaction products, and similar organic solvent soluble resins. When this type of resinous material is used, the final paste contains an emulsion of a resin solution and while the much lower quantity of organic solvent that is required greatly diminishes the fire hazard, there is still the danger of fire being caused by the inflammable vapors becoming concentrated in some part of the printing apparatus. Resins of the third class are the ones that we have found most practical. This class includes the acrylate and methacrylate polymers and drying oil modified alkyd resins. When a resin of this type is used all danger due to inflammable solvents is overcome and no steps subsequent to the printing step are necessary to render the resin wash fast.

Any water insoluble coloring material may be used as the pigment. Water insoluble dyestuffs and inorganic pigments such as chrome green, ultra-marine blue, Hansa yellow, chrome orange, etc., have been used with equal success. Strangely, powdered vat dyes give better color values when applied in the herein disclosed manner than when mixed with the usual starch-dextrine thickener and applied in the usual way. Whether a powdered dyestuff or an inorganic pigment is preferable for a particular paste will depend among other things upon the color desired, a distinct advantage of the invention being that since both types of coloring material may be used, it makes possible a wider selection of colors than has heretofore been available.

The thickening materials that may be used are those that give the required thickness and low internal cohesion when present in relatively low concentration. If more than about 5% of thickener is required, it imparts to the printed textile an undesirable stiffness and reduces the washfastness of the color. In the usual printing method the thickener is removed from the textile after the color becomes set. For this reason an excessive amount of thickener may be used without stiffening the textile. When the herein disclosed pastes are used the thickener as well as the pigment becomes bound to the textile by the resin. If more than a very small amount is used it causes stiffness in the colored part of the fabric and being water soluble, tends to wash out, carrying with it more or less of the coloring material. Among the thickening materials that have been found useful may be mentioned the water soluble methyl and ethyl ethers of cellulose, sodium polyacrylate, locust bean gum, sodium alginate and gum tragacanth. Of these, sodium alginate was found to give the most satisfactory results.

The quantities of resin and pigment that should be used vary with the specific materials selected and will depend on the particular requirements for the printed material. The choice of pigment and quantity needed is determined primarily by the color desired and the covering power of the pigment selected. With some pigments only very small amounts, even less than 1%, will be sufficient. With others, amounts equal to about 5% of the paste are needed. The maximum permissible is governed primarily by the quantity of resin that is needed to bind the pigment to the fabric. Large amounts of pigment require correspondingly large amounts of resin which when present in excessive amounts tend to stiffen the print. In general printing 10% pigment is a practical upper limit but for special applications in which some stiffness can be tolerated, as much as 25% may be used.

It is usually desirable to use an amount of resin equal to the combined weights of the other solid materials in the paste, i. e. pigment and thickener, but this ratio is not critical. Some resins have a greater binding power than others and some pigments require more resin to bind them than do others. These variations in the properties of the materials may be easily determined by simple tests to determine the minimum of resin that will bind the pigment and the maximum that can be used without imparting an undesirable stiffness to the fabric. We have found that with most resins 15% is a practical upper limit and about half that amount the preferred quantity.

Although any suitable procedure may be adapted for mixing the printing pastes, it is usually more desirable to prepare a paste of the thickener alone, add to it the resin solution or dispersion, and then add a separately prepared paste of the finely divided pigment. To illustrate the invention the following examples are given but it should be understood that the invention is not limited to them.

*Example 1.*—A 3% paste of sodium alginate is prepared by merely stirring the gum into cold water until a smooth, uniform paste is produced. To 51 parts by weight of this paste are added 2 parts of a 20% aqueous solution of sodium diisobutylphenoxyethyl sulfate and 2 parts of ammonium hydroxide solution 26° Bé. Other wetting agents may be substituted for the sodium diisobutylphenoxyethyl sulfate. To this paste is added 30 parts by weight of a 25% aqueous emulsion of the copolymer obtained by polymerizing a liquid consisting of 90% methyl acrylate and 10% ethyl methacrylate. The resulting paste is almost white and is of an excellent consistency for printing on textiles by the usual methods. It is used as a base into which any desired pigment may be incorporated. The pigment is prepared in the form of a paste by grinding 30 parts by weight of pigment in a solution of 10 parts of wetting agent in 60 parts of water. The grinding is done in a ball, stone, roll, or colloid mill to assure intimate mixing and thorough dispersion of the pigment. About 15 parts of this pigment paste is mixed into the 85 parts of the resin-thickener mix, whereupon the composition is suitable for printing on fabrics.

If the paste as thus prepared gives a darker shade than is desired, it may be mixed with an unpigmented paste of the following composition:

*Formula*

| | Parts by weight |
|---|---|
| Sodium alginate paste (3%) | 86 |
| Sodium diisobutylphenoxyethyl sulfate (20% sodium in water) | 2 |
| Ammonia (26° Bé.) | 2 |
| Resin emulsion | 10 |

This is prepared by the process used for the preparation of the resin-thickener paste described above, and may be added to the above printing compositions in any proportions without affecting the washfastness or the consistency of the final paste.

Fabrics printed with the above compositions are dried in the customary manner and are then thoroughly washfast.

Example 2.—*Formula*

| | Parts by weight |
|---|---|
| Gum karaya paste (6%) | 65 |
| 40% aqueous emulsion of a linseed oil modified alkyd resin | 30 |
| Dry pigment | 5 |

The gum karaya paste is prepared by dissolving the gum in water. The pigment is milled into the emulsion of resin and the paste and pigmented emulsion mixed. Fabrics printed with this paste are preferably aged in air to insure complete hardening of the resin before they are used.

Example 3.—*Formula*

| | Parts by weight |
|---|---|
| 4% water solution of gum tragacanth | 41 |
| Sodium diisobutylphenoxyethyl sulfate (20% solution in water) | 2 |
| 20% water emulsion of ethyl cellulose dissolved in toluol and butanol | 40 |
| Ammonium hydroxide solution 26° Bé | 2 |
| Pigment paste (prepared as in Example 1) | 15 |

The ingredients are mixed as in Example 1. After the customary drying, fabrics printed with this material are washfast.

Example 4.—*Formula*

| | Parts by weight |
|---|---|
| Sodium alginate paste 3% | 51 |
| Sodium diisobutylphenoxyethyl sulfate (20% solution) | 2 |
| Ammonium hydroxide 26° Bé | 2 |
| 40% emulsion of a 60% butanol solution of a urea formaldehydebutanol resin | 30 |
| Pigment paste (prepared as in Example 1) | 15 |

The above ingredients are mixed as described in Example 1 and before application to the fabric 0.25 part by weight of a 30% monomethylamine hydrochloride solution is added to catalyze the final condensation of the resin. After printing, the fabric is given a short cure, e. g. by heating at 250° F. for five minutes, whereupon a washfast print is obtained.

EXAMPLE 5.—*Formula*

| | Parts by weight |
|---|---|
| Gum tragacanth paste (5%) | 51 |
| Sodium diisobutylphenoxyethyl sulfate (20% solution) | 2 |
| Ammonium hydroxide 26° Bé | 2 |
| 25% emulsion of an oil modified glycerol phthalate resin | 30 |
| Pigment paste (prepared as in Example 1) | 15 |

The mixing is done in a manner analogous to that described in Example 1, and fabric printed with the material is washfast after the customary drying.

If desired, the printing pastes base consisting of water, resin, and thickener may be prepared and stocked or marketed as such and the coloring material added as and when the paste is used. It is likewise within the purview of this invention to use the printing pastes to produce solid colored textiles. In such uses it may be desirable to reduce the consistency of the paste which can be accomplished by reducing the quantity of thickener used.

When a plurality of colors are to be printed on a textile and it is desirable to use for some of the colors the previously known standard method wherein a dyestuff and a starch thickener form the paste, the novel pastes herein disclosed may be used on the same machines for the other colors without either interfering in any way with the operation of the other. It is also possible by using metal powders as the pigment in the new pastes to obtain color effects not obtainable with the previously known printing pastes.

While the pastes herein disclosed are of particular value in printing textiles, they may also be used for coloring other materials such as paper and leather.

Wherever in the foregoing description and in the following claims percentages are referred to, it is to be understood that percentages by weight based on the total weight of the paste are meant.

We claim:

1. A textile printing paste comprising a viscous aqueous solution of about 1.5% to 5% of a thickening agent selected from the group consisting of water-soluble methyl cellulose, water-soluble ethyl cellulose, sodium polyacrylate, locust bean gum, sodium alginate, gum tragacanth, and gum karaya and having uniformly dispersed in said solution 1% to 10% of a finely divided, water-insoluble coloring material and about 2.5% to 15% of a water-insoluble resin which forms a film when deposited from an aqueous dispersion.

2. A textile printing paste comprising a viscous aqueous solution of 1.5% to 5% of a thickening agent selected from the group consisting of water-soluble methyl cellulose, water-soluble ethyl cellulose, sodium polyacrylate, locust bean gum, sodium alginate, gum tragacanth, and gum karaya and having uniformly dispersed in said solution 1% to 10% of a finely divided, water-insoluble pigment and about 2.5% to 15% of a solvent-free, water-insoluble resin which forms a film when deposited from an aqueous dispersion.

3. A textile printing paste comprising a viscous aqueous solution of 1.5% to 5% of a thickening agent selected from the group consisting of water-soluble methyl cellulose, water-soluble ethyl cellulose, sodium polyacrylate, locust bean gum, sodium alginate, gum tragacanth, and gum karaya and having uniformly dispersed in said solution 1% to 10% of a finely divided, water-insoluble pigment and about 2.5% to 10% of an acrylic ester polymer.

4. A textile printing paste comprising a viscous aqueous solution of 1.5% to 5% of a thickening agent selected from the group consisting of water-soluble methyl cellulose, water-soluble ethyl cellulose, sodium polyacrylate, locust bean gum, sodium alginate, gum tragacanth, and gum karaya and having uniformly dispersed in said solution 1% to 10% of a finely divided, water-insoluble pigment and about 2.5% to 10% of an interpolymer of an acrylic ester and a methacrylic ester.

5. A textile printing paste comprising water, about 5% of a finely divided inorganic pigment dispersed therein, about 7½% of an interpolymer of methyl acrylate and ethyl methacrylate intimately dispersed therein, and about 2% of sodium alginate.

6. A base for a textile printing paste comprising a viscous aqueous solution of 1.5% to 5% of a thickening agent selected from the group consisting of water-soluble methyl cellulose, water-soluble ethyl cellulose, sodium polyacrylate, locust bean gum, sodium alginate, gum tragacanth, and gum karaya and having uniformly dispersed in said solution about 2.5% to 10% of a water-insoluble resin which forms a film when deposited from an aqueous dispersion.

7. A base for a textile printing paste comprising a viscous aqueous solution of 1.5% to 5% of a thickening agent selected from the group consisting of water-soluble methyl cellulose, water-soluble ethyl cellulose, sodium polyacrylate, locust bean gum, sodium alginate, gum tragacanth, and gum karaya and having uniformly dispersed in said solution 2.5% to 10% of an interpolymer of an acrylic ester and a methacrylic ester.

8. A base for a textile printing paste comprising a viscous aqueous solution of about 2% sodium alginate having uniformly dispersed therein about 7½% of an interpolymer of methyl acrylate and ethyl methacrylate.

DONALD H. POWERS.
SIVERT N. GLARUM.